United States Patent
Maruyama et al.

(10) Patent No.: US 10,214,242 B2
(45) Date of Patent: Feb. 26, 2019

(54) FRONT VEHICLE-BODY STRUCTURE OF VEHICLE

(71) Applicant: MAZDA MOTOR CORPORATION, Hiroshima (JP)

(72) Inventors: Kenji Maruyama, Hiroshima (JP); Kazuki Yamauchi, Aki-gun (JP); Hidenori Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/592,402

(22) Filed: May 11, 2017

(65) Prior Publication Data
US 2018/0029643 A1   Feb. 1, 2018

(30) Foreign Application Priority Data
Jul. 27, 2016   (JP) ................................. 2016-147403

(51) Int. Cl.
*B62D 21/11* (2006.01)
*B62D 25/08* (2006.01)

(52) U.S. Cl.
CPC ............ *B62D 21/11* (2013.01); *B62D 25/088* (2013.01)

(58) Field of Classification Search
CPC .............................. B62D 25/088; B62D 21/11
USPC ..................................................... 296/193.09
See application file for complete search history.

(56) References Cited

U.S. PATENT DOCUMENTS

| 7,887,123 B2 * | 2/2011 | Honji | B62D 21/152 |
| | | | 280/488 |
| 8,857,902 B2 * | 10/2014 | Sekiguchi | B62D 25/082 |
| | | | 296/187.09 |

FOREIGN PATENT DOCUMENTS

JP   2016-005939 A   1/2016

* cited by examiner

*Primary Examiner* — Joseph D. Pape
*Assistant Examiner* — Dana D Ivey
(74) *Attorney, Agent, or Firm* — Studebaker & Brackett PC

(57) ABSTRACT

A front vehicle-body structure of a vehicle comprises a front frame which extends in a longitudinal direction, an apron reinforcement which is positioned above and on an outward side, in a vehicle width direction, of the front frame and extends in the longitudinal direction, and a suspension housing which is provided to be laid between the front frame and the apron reinforcement and accommodating a suspension therein, wherein the suspension housing includes a narrow-width portion which has the narrowest width in the longitudinal direction in an upper view, and a suspension tower portion where a damper member of the suspension is attached is formed at a portion of the suspension housing which includes the narrow-width portion.

9 Claims, 10 Drawing Sheets

FRONT VEHICLE-BODY STRUCTURE OF VEHICLE

BACKGROUND OF THE INVENTION

The present invention relates to a front vehicle-body structure of a vehicle.

The front vehicle-body structure of the vehicle which comprises a front frame extending in a longitudinal direction, an apron reinforcement positioned above and on an outward side, in a vehicle width direction, of the front frame and extending in the longitudinal direction, and a suspension housing provided to be laid between the front frame and the apron reinforcement and accommodating a suspension therein is known.

The suspension housing is configured such that a suspension tower portion protrudes upward at a central portion, in the vehicle width direction, of the suspension housing in a plan view. A damper member of the suspension is attached to the suspension tower portion (see Japanese Patent Laid-Open publication No. 2016-005939, for example).

Herein, the suspension housing is configured to be wide in the longitudinal direction so that both end portions, in the vehicle width direction, thereof which are joined to the apron reinforcement and the front frame can secure the rigidity of a joint portion, and also configured such that its front wall portion and rear wall portion connect the both end portions being configured to be wide linearly in the vehicle width direction.

In this case, an intermediate portion, in the vehicle width direction, of the suspension tower portion is spaced apart from the apron reinforcement and the front frame which have the high rigidity in the vehicle width direction, respectively, and configured to be wide in the longitudinal direction, so that its facial rigidity tends to be too low. Accordingly, the rigidity of the vertical direction of the suspension tower portion decreases improperly.

Therefore, there is still room for improvement in increasing the rigidity of the vertical direction of a roughly-central portion, in the vehicle width direction, of the suspension housing in order to improve the rigidity of the vertical direction of the suspension tower portion.

SUMMARY OF THE INVENTION

The present invention has been devised in view of the above-described matter, and an object of the present invention is to provide a front vehicle-body structure of a vehicle which can improve the rigidity of the vertical direction of the suspension tower by improving the rigidity of the roughly-central portion, in the vehicle width direction, of the suspension housing.

The present invention is a front vehicle-body structure of a vehicle, comprising a front frame extending in a longitudinal direction, an apron reinforcement positioned above and on an outward side, in a vehicle width direction, of the front frame and extending in the longitudinal direction, and a suspension housing provided to be laid between the front frame and the apron reinforcement and accommodating a suspension therein, wherein the suspension housing includes a narrow-width portion which has the narrowest width in the longitudinal direction in an upper view, and a suspension tower portion where a damper member of the suspension is attached is formed at a portion of the suspension housing which includes the narrow-width portion.

According to the present invention, since the narrow-wide portion has the narrow width in the longitudinal direction so that deformation caused by a load input is suppressed, the facial rigidity is improved. Accordingly, by forming the suspension tower portion at the narrow-wide portion having the improved facial rigidity, the rigidity of the vertical direction of the suspension tower portion can be improved properly.

In an embodiment of the present invention, the suspension housing further includes an upper-arm attachment portion where an upper arm of the suspension is vertically rotatably attached, and the suspension housing is configured such that a width, in the longitudinal direction, thereof gradually decreases from the upper-arm attachment portion toward the narrow-width portion so as to match a shape of the upper arm.

According to this embodiment, the narrow-wide portion can be formed, properly preventing interference of the upper arm with the suspension housing.

In another embodiment of the present invention, protrusion portion which protrudes upward is formed at the suspension housing on an opposite side, in the vehicle width direction, to the upper-arm attachment portion relatively to the suspension tower portion, the protrusion portion being configured to avoid interference thereof with a tip portion of the upper arm which has rotated upward.

According to this embodiment, in addition to preventing the interference of the upper arm with the suspension housing, the protrusion portion is made to serve as a rib, so that the rigidity of the vertical direction of the suspension housing can be improved.

In another embodiment of the present invention, an apron frame which extends in the longitudinal direction is provided at an outward-end portion, in the vehicle width direction, of the suspension housing between the apron reinforcement and the suspension housing, the suspension housing further includes a vehicle-width-direction wall portion which protrudes toward the suspension and extends in a vertical direction and in the vehicle width direction in a vehicle front view, the vehicle-width-direction wall portion is composed of a pair of front-and-rear portions which are positioned on at least one side or both sides of a forward side and a reward side of the suspension tower portion, and the pair of front-and-rear vehicle-width-direction wall portions are interconnected in the longitudinal direction by a longitudinal-direction wall portion around the suspension tower portion.

In the present specification (description), the above-descried vehicle-width-direction wall portion includes not only a portion which protrudes alone as a rib or bead but a wall portion which forms an outer body of the housing, for example, a front wall portion which defines a front end portion of the housing and a rear wall portion which defines a rear end portion of the housing.

Further, the above-described pair of front-and-rear vehicle-width-direction wall portions include a pair of front-and-rear portions which are positioned in front of the suspension tower portion or in back of the suspension tower portion, not including a pair of front-and-rear portions which are positioned so as to interpose the suspension tower portion therebetween.

According to this embodiment, a U-shaped sectional portion which extends in the vehicle width direction can be formed by the longitudinal-direction wall portion in front or back of the suspension tower portion. Further, changing of the cross section of the U-shaped sectional portion can be suppressed by the longitudinal-direction wall portion. Accordingly, the bending rigidity of the vehicle width direction of the suspension housing can be further improved by the U-shaped sectional portion configured to have the high rigidity.

In another embodiment of the present invention, one of the pair of front-and-rear vehicle-width-direction wall portions which is located at a position opposite to the suspension tower portion in the longitudinal direction includes a pair of right-and-left inclination portions on both sides, in the vehicle width direction, of the suspension tower portion, the pair of right-and-left inclination portions being configured to be inclined, in the longitudinal direction, toward the suspension tower portion relatively to the vehicle width direction, and the longitudinal-direction wall portion is composed of a pair of portions which are formed at both sides, in the vehicle width direction, of the suspension tower portion so as to be provided substantially perpendicularly to the pair of right-and-left inclination portions.

According to this embodiment, since the pair of longitudinal-direction wall portions are provided to surround the suspension tower portion, a truss structure where these wall portions and the suspension tower portion are arranged in a roughly-triangular shape is formed. Thereby, the rigidity of a surrounding of the suspension tower portion can be improved further effectively.

Other features, aspects, and advantages of the present invention will become apparent from the following description which refers to the accompanying drawings.

DETAILED DESCRIPTION OF THE INVENTION

Hereafter, embodiments of the present invention will be described referring to the accompanying drawings. In the following, a one-side (right-side) part, in a vehicle width direction, of a front vehicle-body structure 1 of a vehicle will be described. However, the front vehicle-body structure 1 is configured to be symmetrical, and therefore the other-side (left-side) part of that is configured to be similar. In respective figures of the drawings, forward/rearward, inward/outward, and upward/downward directions show a longitudinal direction, a width direction, and a vertical direction of a vehicle, respectively, unless otherwise noted.

[Whole Structure of Front Vehicle-Body Structure 1]

Figure 1:
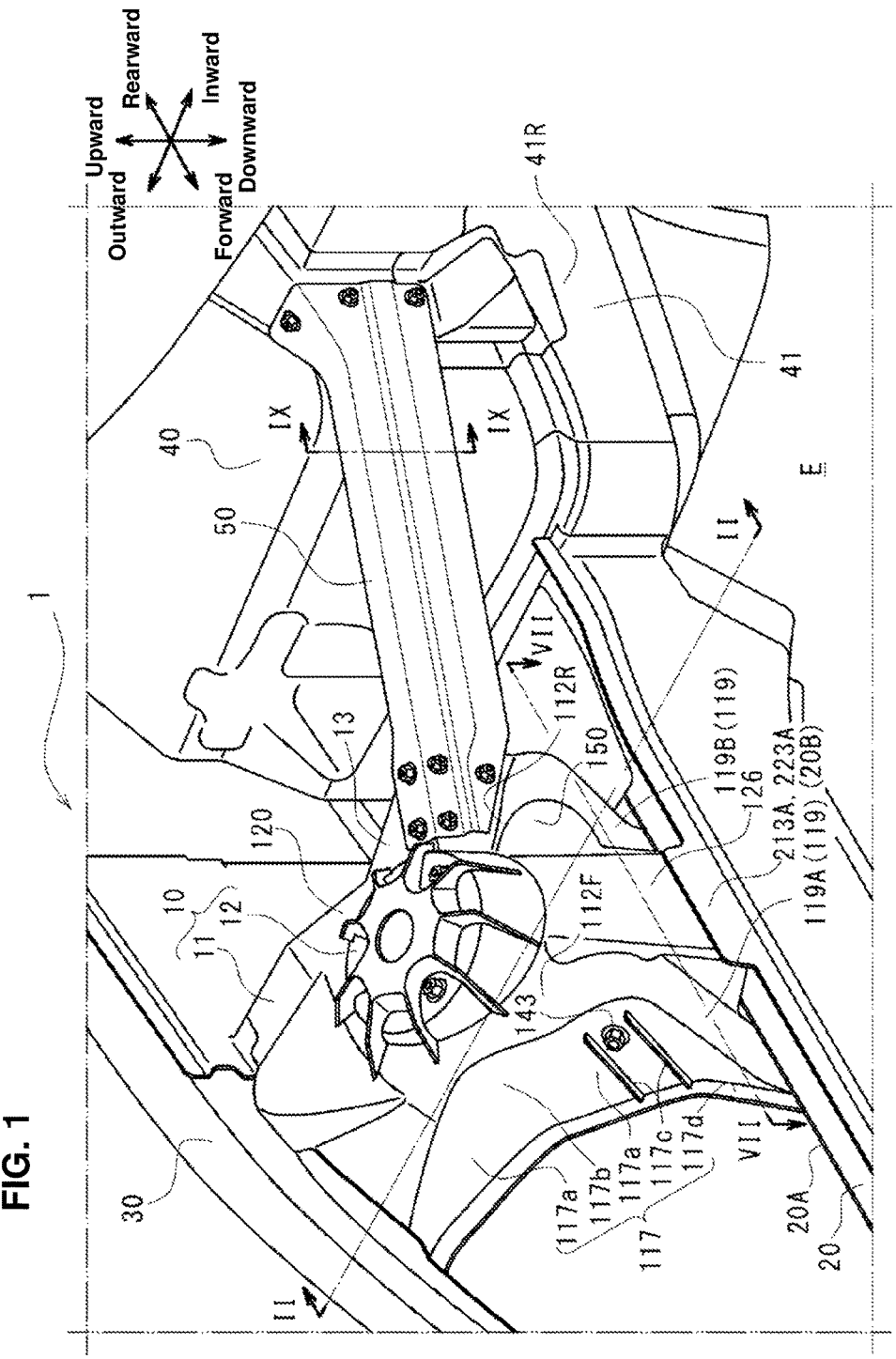
FIG. 1 is a perspective view showing a front vehicle-body structure of a vehicle according to an embodiment of the present invention.

FIG. 1 shows the front vehicle-body 1 of the embodiment of the present invention. As shown in FIG. 1, the front vehicle-body structure 1 comprises a front frame 20 which extends in the longitudinal direction, an apron reinforcement 30 which is positioned above and on an outward side, in the vehicle width direction, of the front frame 20 and extends in the longitudinal direction, a suspension housing 10 which is laid, in the vehicle width direction, between the front frame 20 and the apron reinforcement 30, and a dash panel 40 which partitions a rear side of an engine room E, extending in the vehicle width direction. The suspension housing 10 is connected to the dash panel 40 in the longitudinal direction via a connecting member 50.

Figure 2:
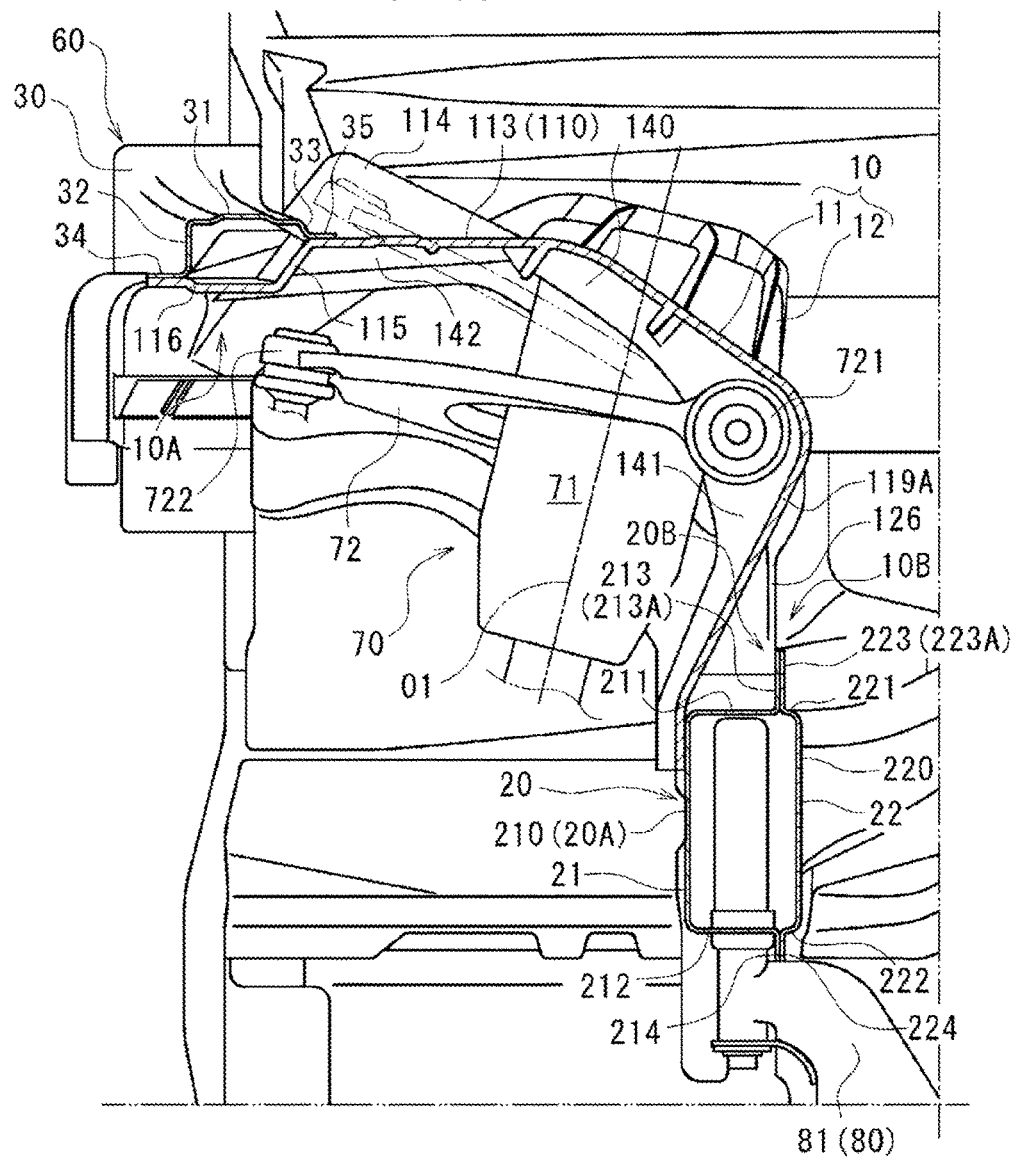
FIG. 2 is a sectional view taken along line II-II of FIG. 1.

FIG. 2 is a sectional view taken along line II-II of FIG. 1, which shows a cross section of the suspension housing 10 which is parallel to the vehicle width direction and the vertical direction. As shown in FIG. 2, the suspension housing 10 accommodates a suspension 70 therein. In the present embodiment, the suspension 70 is a double-wishbone type suspension, which comprises a damper member 71 which includes a shock absorber and a coil spring and an upper arm 72. These members are installed inside the suspension housing 10.

Figure 3:
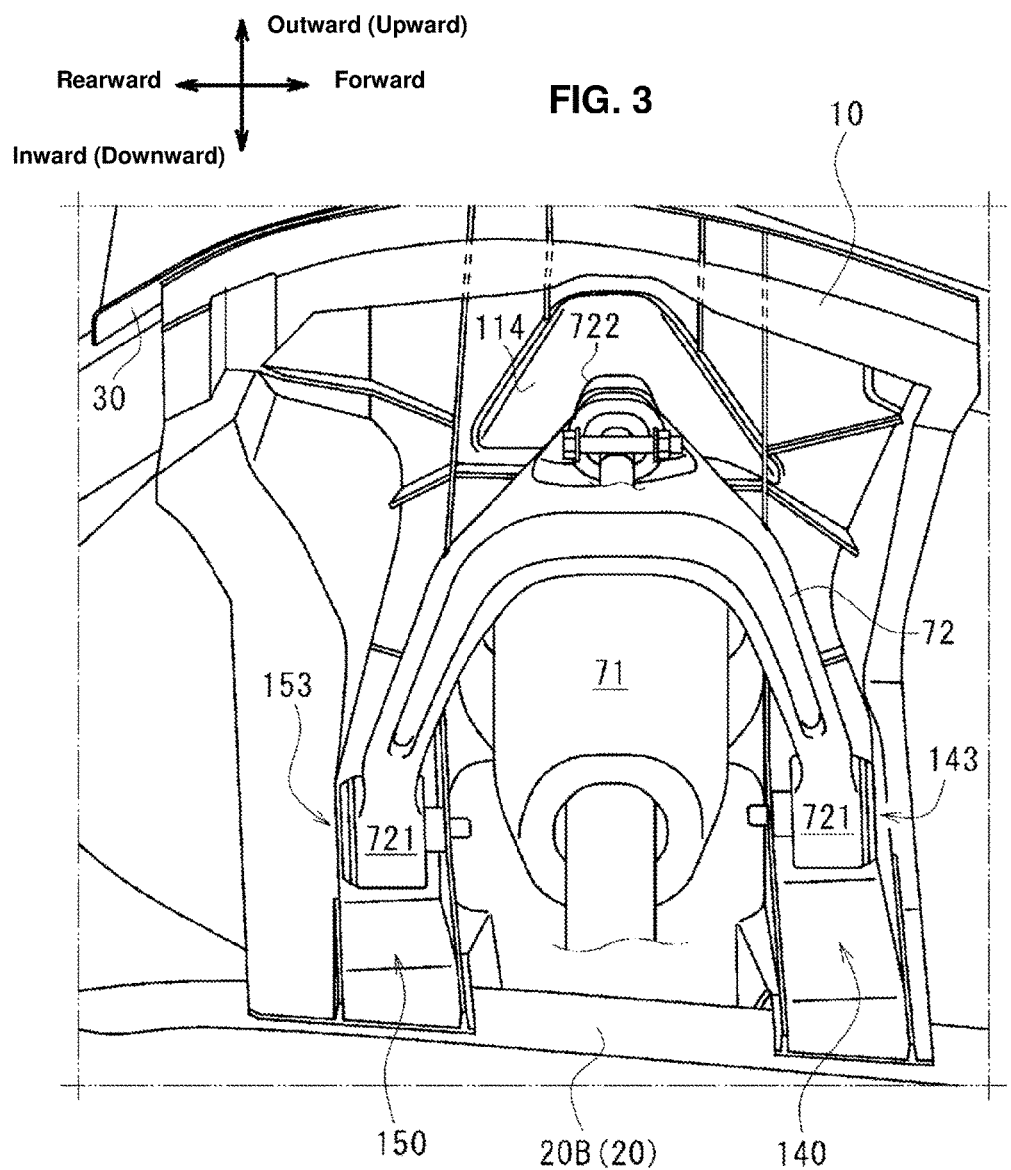
FIG. 3 is a perspective view of a surrounding of a suspension housing, when viewed from below.

FIG. 3 is a perspective view of a surrounding of the suspension housing 10, when viewed from below. Referring to FIG. 3 as well, the upper arm 72 comprises a pair of front-and-rear arm-inward end portions 721, 721 which are provided to longitudinally straddle an inward-side portion, in the vehicle width direction, of the damper member 71 and an arm outward-end portion 722 which is positioned on the outward side, in the vehicle width direction, of the damper member 71. The upper arm 72 is of a V shape in the plan view, and is connected such that it straddles the damper member 71 from an outward side in the vehicle width direction.

The pair of front-and-rear arm inward-end portions 721 are rotatably attached to the suspension housing 10 around a rotational axis which extends in the vehicle longitudinal direction, and the arm outward-end portion 722 is connected to a suspension forming member (not illustrated) positioned below. That is, the upper arm 72 is configured to rotate around the arm inward-end portions 721, 721 in such a manner that the arm outward-end portion 722 is moved vertically when receiving a vertical-direction input force.

As shown in FIG. 2, a front suspension cross member 80 is laid between a pair of right-and-left front frames 20, 20 (only a one-side front frame is shown in FIG. 2). The front suspension cross member 80 includes a pair of right-and-left cross-member attaching arms 81, 81 which are provided to extend upward and outward at both end portions, in the vehicle width direction, of the front suspension cross member 80. The front suspension cross member 80 is attached to respective lower faces of the pair of right-and-left front frames 20, 20 via the cross-member attaching arms 81, 81.

Hereafter, the respective members will be described.

[Front Frame 20]

As shown in FIG. 2, the front frame 20 comprises a frame outer 21 which is positioned on the outward side, in the vehicle width direction, of the vehicle and a frame inner 22 which is positioned on the inward side, in the vehicle width direction, of the vehicle. These members 21, 22 are joined together.

The frame outer 21 is made by bending a steel plate so as to have a roughly U-shaped cross section which opens inward in the vehicle width direction, which extends in the vehicle longitudinal direction. The frame inner 22 is made by bending a steel plate so as to have a roughly U-shaped cross section which opens outward in the vehicle width direction, which extends in the vehicle longitudinal direction.

The frame outer 21 includes a side plate 210 which extends in the vertical direction, an upward plate 211 and a downward plate 212 which respectively extend inward, in the vehicle width direction, from an upper end portion and a lower end portion of the side plate 210, an upper flange 213 which extends upward from a left end portion of the upward plate 211, and a lower flange 214 which extends downward from a left end portion of the downward plate 212.

The frame inner 22 includes a side plate 220 which extends in the vertical direction, an upward plate 221 and a downward plate 222 which respectively extend inward, in the vehicle width direction, from an upper end portion and a lower end portion of the side plate 220, an upper flange 223 which extends upward from a right end portion of the upward plate 221, and a lower flange 224 which extends downward from a right end portion of the downward plate 222.

The frame outer 21 and the frame inner 22 are joined together by spot welding, for example, by making the upper frames 213, 223 and the lower flanges 214, 224 contact each other, respectively, so that a roughly-rectangular closed cross section is formed at the front frame 20. Referring to FIG. 1 as well, the upper flanges 213, 223 partially include wide portions 213A, 223A which are configured to be wide in the vertical direction, respectively.

The connection portions of the frame outer 21 and the frame inner 22, that is, the upper flanges 213, 223 and the lower flanges 214, 224 are positioned on the inward side, in the vehicle width direction, of a central portion, in the vehicle width direction, of the front frame 20. More specifically, the upper flanges 213, 223 and the lower flanges 214, 224 are positioned at a vehicle-width-direction position which is closer to the side plate 220 of the frame inner 22. That is, the frame outer 21 is configured to be wider, in the vehicle width direction, than the frame inner 22, and the cross-member attaching arm 81 of the front suspension cross member 80 is attached to the downward plate 212 of the frame outer 21.

A housing inward-end portion 10B is joined to an outer face 20A of the front frame 20 which is formed by the side plate 210 of the frame outer 21 and a flange portion 20B of the front frame 20 which is formed by the wide portions 213A, 223A.

[Apron Reinforcement 30]

As shown in FIG. 1, the apron reinforcement 30 is configured to extend obliquely forward and inward. As shown in FIG. 2, the apron reinforcement 30 is made by bending a steel plate so as to have a roughly U-shaped cross section which opens downward, and comprises an upward plate 31 which extends in the vehicle width direction, an outward plate 32 which extends downward from an outward end portion, in the vehicle width direction, of the upward plate 31, an inward plate 33 which extends downward from an inward end portion, in the vehicle width direction, of the upward plate 31, an outward flange 34 which extends outward, in the vehicle width direction, from a lower end portion of the outward plate 32, and an inward flange 35 which extends inward, in the vehicle width direction, from a lower end portion of the inward plate 33.

[Dash Panel 40]

As shown in FIG. 1, the dash panel 40 includes a protrusion portion 41 which protrudes rearward in the vehicle longitudinal direction at a roughly central portion, in the vehicle width direction, thereof, which is configured to be continuous to a tunnel portion (not illustrated) at a lower portion of the protrusion portion 41.

[Suspension Housing 10]

As shown in FIG. 1, the suspension housing 10 comprises a housing body 11 which covers a right-side front wheel (not illustrated) from an inward side in the vehicle width direction and a suspension tower portion 12 which protrudes upward from the housing body 11 in a tower shape, which is made by an aluminum die-casting method as an aluminum-alloy made member.

As shown in FIG. 2, an upper portion of the damper member 71 of the suspension 70 is accommodated inside the suspension tower portion 12. The damper member 71 is provided such that its center line O1 extends obliquely such that its upper portion is positioned inward, in the vehicle width direction, relatively to its lower portion, so that the suspension tower portion 12 is inclined inward in the vehicle width direction as well. Accordingly, when the suspension tower portion 12 receives a load from the damper member 71 in its axial direction, an inward-directional component, in the vehicle width direction, of this load greatly influences the suspension tower portion 12.

The suspension tower portion 12 is joined to the apron reinforcement 30 at a housing outward-end portion 10A which is positioned on the outward side, in the vehicle width direction, of the vehicle, and joined to the front frame 20 at a housing inward-end portion 10A which is positioned on the inward side, in the vehicle width direction, of the vehicle. As described above, the suspension hosing 10 is the aluminum-alloy made member, and the front frame 20 and the apron reinforcement 30 are the steel-plate made members. Accordingly, any appropriate joining means, such as SPR (Self-Pierce Rivet), may be used for joining of these different-kind metal members.

[Housing Body 11]

Figure 4:
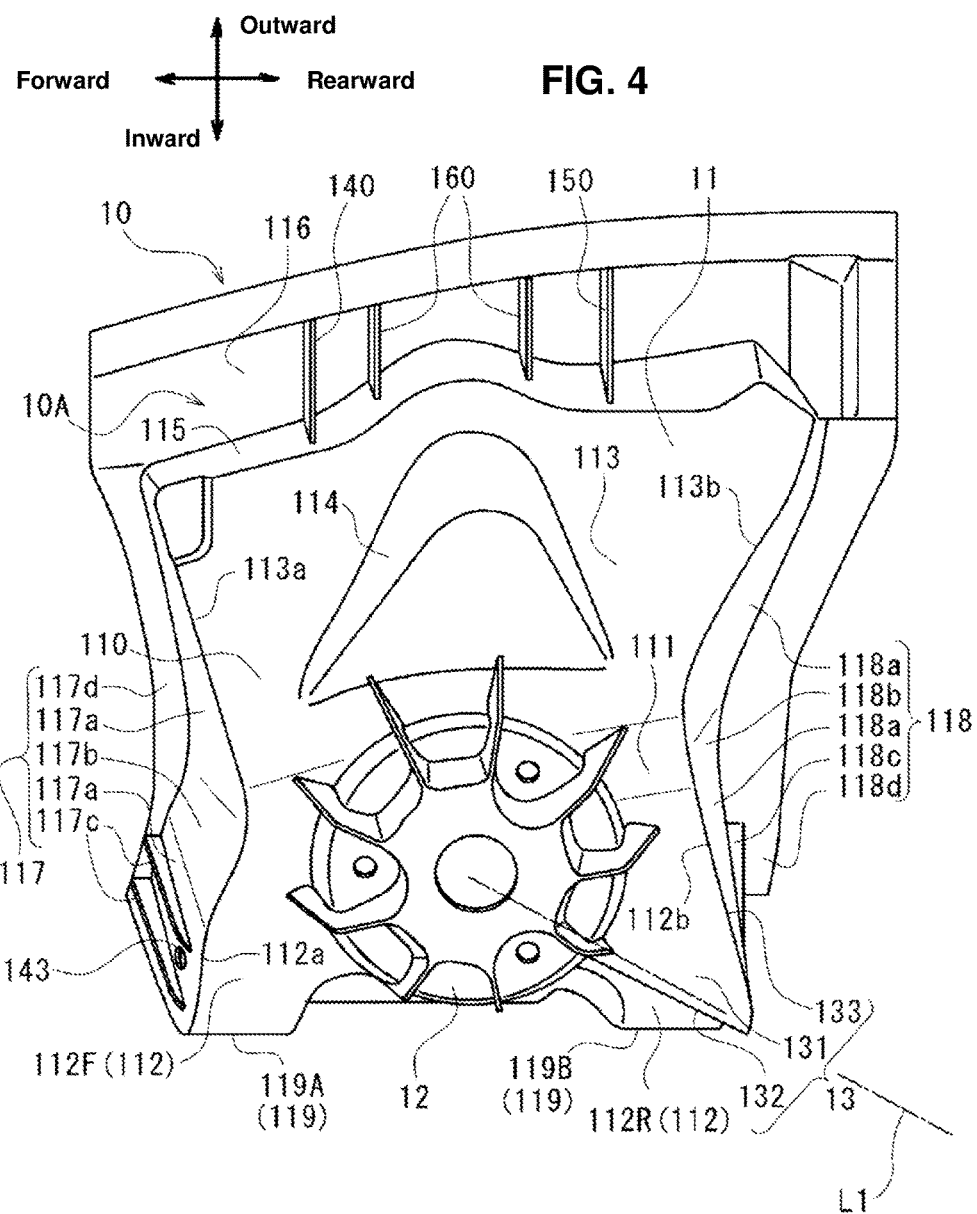
FIG. 4 is a perspective view of the suspension housing, when viewed from above.

FIG. 4 is a plan view of the suspension housing 10 only, when viewed from above. As shown in FIG. 4, the housing body 11 comprises a housing upper wall portion 110 which extends in the vehicle width direction and in the vehicle longitudinal direction, a housing front wall portion 117 and a housing rear wall portion 118 which extend downward from a front end portion and a rear end portion of the housing upper wall portion 110, and a housing inward-vertical wall portion 119 which extends downward from an inward end portion, in the vehicle width direction, of the housing upper wall portion 110 and is connected to the housing front wall portion 117 and the housing rear wall portion 118.

The housing upper wall portion 110 includes a narrow-width portion 111 which has the narrowest width in the longitudinal direction at a midway position (specifically, at a central position), in the vehicle width direction, thereof, which is formed in a roughly X shape in an upper view. The housing upper wall portion 110 comprises an inward upper wall portion 112 which is positioned on the inward side, in the vehicle width direction, of the narrow-width portion 111 and an outward upper wall portion 113 which is positioned on the outward side, in the vehicle width direction, of the narrow-width portion 111.

The suspension tower portion 12 is configured to protrude upward at a portion of the housing upper wall portion 110 which includes the narrow-width portion 111.

The inward upper wall portion 112 extends outward, in the vehicle width direction, toward the narrow-width portion 111 in the plan view such that a front end edge portion 112a and a rear end edge portion 112b match the V shape (see FIG. 3) of the upper arm 72 which is accommodated inside (below) the inward upper wall portion 112. In other words, the inward upper wall portion 112 is configured such that its longitudinal width decreases gradually toward an outward side, in the vehicle width direction, thereof. Thereby, it is prevented that the upper arm 72 moving vertically interferes with the housing upper wall portion 110 (the inward upper wall portion 112).

The inward upper wall portion 112 is longitudinally split into a front-side inward upper wall portion 112F which is positioned on a forward side and a rear-side inward upper wall portion 112R which is positioned on the rearward side by the suspension tower portion 12. Referring to FIG. 3 as well, the front-side arm inward-end portion 721 of the upper arm 72 is attached to the front-side inward upper wall portion 112F. The rear-side arm inward-end portion 721 of the upper arm 72 is attached to the rear-side inward upper wall portion 112R.

The outward upper wall portion 113 is configured such that its longitudinal width increases gradually toward an outward side, in the vehicle width direction, thereof. Specifically, a front end edge portion 113a and a rear end edge portion 113b of the outward upper wall portion 113 extend outward, in the vehicle width direction, of the vehicle from the narrow-width portion 111 so as to be roughly perpendicular to the apron reinforcement 30 in the plan view.

At the outward upper wall portion 113 is formed an outward protrusion portion 114 which protrudes upward. The outward protrusion portion 114 protrudes upward along a shape of the side of the arm outward end portion 722 in the plan view so as to avoid its interference with the arm outward end portion 722 of the upper arm 72 which has moved (rotated) upward (shown by an imaginary line in FIG. 2).

Herein, the housing upper wall portion 110 is configured to have a relatively-high facial rigidity at a portion closer to its outward-side portion which is joined to the apron reinforcement 30 having a high rigidity and another portion closer to its inward-side portion which is continuous to the housing inward-vertical wall portion 119 having a high rigidity via a curve portion. Meanwhile, a midway portion, in the vehicle width direction, of the housing upper wall portion 110, especially a central portion thereof is located away from the apron reinforcement 30 and the curve portion which have a high rigidity, so that its facial rigidity tends to be relatively low, compared with both end portions of the housing upper wall portion 110.

However, the housing upper wall portion 110 includes the narrow-width portion 111 which has the narrowest longitudinal-direction width at the central position, in the vehicle width direction, thereof. Since deformation against the load input is suppressed by making the longitudinal-direction width small (narrow), the facial rigidity can be improved. That is, the facial rigidity of the central portion, in the vehicle width direction, of the housing upper wall portion 110 can be improved by forming the narrow-width portion 111. Further, the vertical-direction rigidity of the suspension tower portion 12 can be improved by forming the suspension tower portion 12 at the portion including the narrow-width portion 111.

Moreover, since the inward upper wall portion 112 is sprit into the front-side inward upper wall portion 112F and the rear-side inward upper wall portion 112R, the respective longitudinal-direction widths of these are configured to be small (narrow), so that the facial rigidity can be increased further. Also, since the outward upper wall portion 113 serves as a rib, the facial rigidity can be increased further. Accordingly, the facial rigidity of the housing upper wall portion 110 is improved further as a whole by the inward upper wall portion 112 and the outward upper wall portion 11, so that the vertical-direction rigidity of the suspension tower portion 12 can be improved further.

As shown in FIG. 2, a housing outward flange portion 116 which extends outward is formed at a position of the housing outward-end portion 10A which is configured to lower one-stepwise from the housing upper wall portion 110 via a vertical wall portion 115.

The apron reinforcement 30 is joined to the housing outward-end portion 10A from above, and an apron frame 60 which extends in the vehicle longitudinal direction and has a closed cross section is formed by the housing outward-end portion 10A and the apron reinforcement 30. Specifically, the outward flange 34 of the apron reinforcement 30 is joined to the housing outward flange portion 116 from above, and the inward flange 35 is joined to a portion of the outward-side upper wall portion 113 which is positioned closely to the vertical wall portion 115.

The rigidity of an outward-side portion, in the vehicle width direction, of the suspension housing 10 can be increased effectively by the apron frame 60 extending in the longitudinal direction and having the closed cross section.

As shown in FIG. 4, the housing front wall portion 117 includes a pair of front wall inclination portions 117a, 117a which are inclined rearward toward the narrow-width portion 111 at both sides, in the vehicle width direction, of the narrow-width portion 111 in the plan view, and between these inclination portions 117a, 117a is formed a front wall curve portion 117b which curves so as to interconnect these portions 117a, 117a. The rigidity of the vertical direction of the housing front wall portion 117 is increased by the front wall curve portion 117b. At a lower end portion of the housing front wall portion 117 is formed a housing forward flange portion 117d which extends forward.

Likewise, the housing rear wall portion 118 includes a pair of rear wall inclination portions 118a, 118a which are inclined forward toward the narrow-width portion 111 at the both sides, in the vehicle width direction, of the narrow-width portion 111 in the plan view, and between these inclination portions 118a, 118a is formed a rear wall curve portion 118b which is configured to curve so as to interconnect these portions 118a, 118a. The rigidity of the vertical direction of the housing rear wall portion 118 is increased by the rear wall curve portion 118b. At a lower end portion of the housing rear wall portion 118 is formed a housing rearward flange portion 118d which extends rearward.

Herein, the narrow-width portion 111 partitions an upper edge portion of the front wall curve portion 117b and an upper edge portion of the rear wall curve portion 118b as a longitudinal-direction connecting area.

A connecting-member attachment portion 13, to which the connecting member 50 (see FIG. 1) is attached, is provided at the rear inward upper wall portion 112R to protrude upward. The connecting-member attachment portion 13 comprises a first face portion 131 which extends roughly horizontally and a second face portion 132 which extends downward from an inward end portion, in the vehicle width direction, of the first face portion 131 and is inclined rearward and inward in the plan view. A rear face 133 of the connecting-member attachment portion 13 is formed by making the rear wall inclination portion 118a of the housing rear wall portion 118 extend upward. Accordingly, the connecting-member attachment portion 13 is formed in a wedge shape by the second face portion 132 and the rear face 133 which intersects with an acute angle in the plan view.

As shown in FIG. 4, the second face portion 132 extends on a line L1 which interconnects a central portion of the suspension tower portion 12 and a right-side wall portion 41R (see FIG. 1) of the protrusion portion 41 of the dash panel 40 in the plan view.

As shown in FIG. 1, the housing inward-vertical wall portion 119 is longitudinally split into a front-side inward vertical wall portion 119A which is positioned on the forward side and a rear-side inward vertical wall portion 119B which is positioned on the rearward side by a tower outer-peripheral wall portion 126 of the suspension tower portion 12. The front-side inward vertical wall portion 119A extends downward from an inward end portion, in the vehicle width direction, of the front-side inward upper wall portion 112F. The rear-side inward vertical wall portion 119B extends downward from an inward end portion, in the vehicle width direction, of the rear-side inward upper wall portion 112R.

Referring to FIG. 2 as well, the front-side inward vertical wall portion 119A and the rear-side inward vertical wall portion 119B are configured such that their upper portions are positioned on the inward side, in the vehicle width direction, of an inward-side portion of the tower outer-peripheral wall portion 126 of the suspension tower portion 12, extend obliquely downward and outward, and their lower-half portions are positioned on the outward side of the tower outer-peripheral wall portion 126. The front-side inward vertical wall portion 119A and the rear-side inward vertical wall portion 119B are joined to the outer face 20A of the front frame 20 at their end portions.

Figure 5:
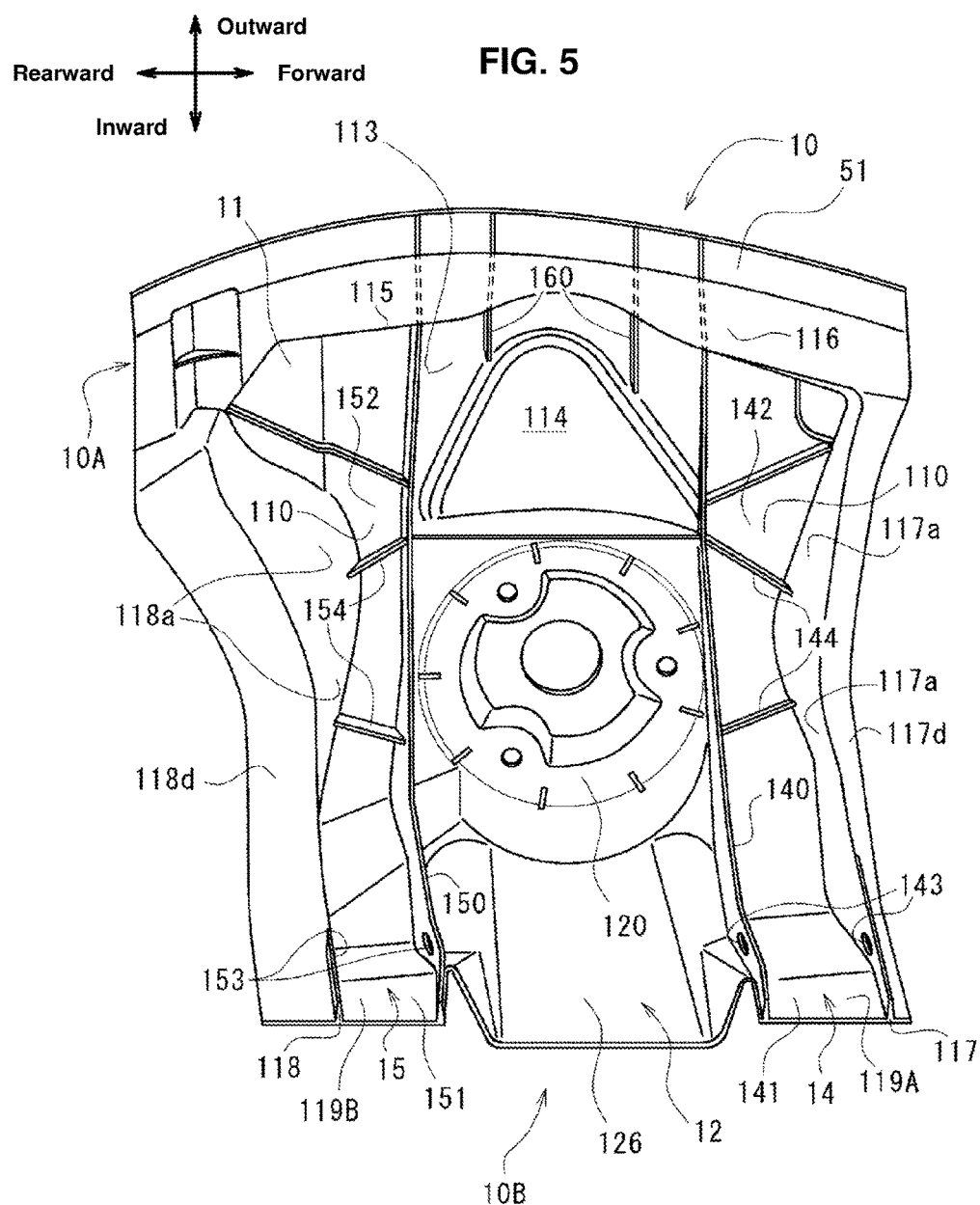
FIG. 5 is a perspective view of the suspension housing, when viewed from below.

FIG. 5 is a perspective view of the suspension housing 10, when viewed from below. As shown in FIG. 5, a front-side vehicle-width-direction wall portion 140 and a rear-side vehicle-width-direction wall portion 150 which extend in the vehicle width direction are formed at an inner-face side of the suspension housing 10, longitudinally adjacently to the suspension tower portion 12.

Figure 6:
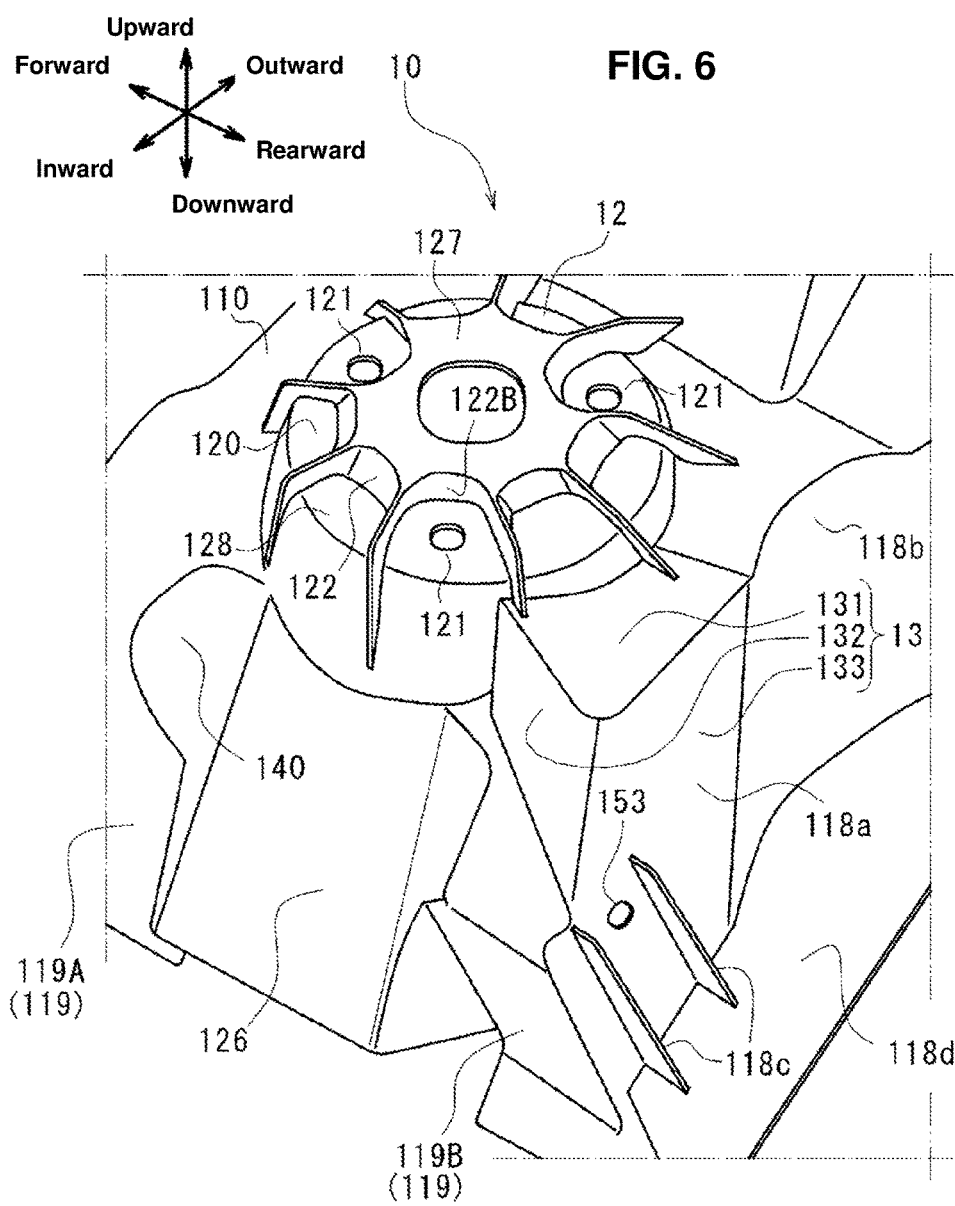
FIG. 6 is a perspective view of the suspension housing, when viewed from behind.

The front-side vehicle-width-direction wall portion 140 is configured to protrude in a rib shape on an inner-face side of the housing body 11, and referring to FIG. 6 as well which is a perspective view of the suspension housing 10 itself, when viewed from behind, a portion of the housing inward-vertical wall portion 119 which is positioned on the inward side, in the vehicle width direction, of the suspension tower portion 12 is configured to be exposed to an outer-surface side.

As shown in FIG. 2, the front-side vehicle-width-direction wall portion 140 is configured such that its outward end portion extends up to the housing outward-end portion 10A and its inward end portion extends up to the housing inward-end portion 10B. Accordingly, the front-side vehicle-width-direction wall portion 140 extends continuously over an area from the housing outward-end portion 10A to the housing inward-end portion 10B.

Herein, in the housing outward-end portion 10A, the front-side vehicle-width-direction wall portion 140 extends continuously from a lower-face side of the outward-side upper wall portion 113 to an upper-face side of the housing outward flange portion 116 via the vertical wall portion 115. Thereby, the front-side vehicle-width-direction wall portion 140 extends in the vehicle width direction over the inside of the closed cross section of the apron frame 60.

Likewise, as shown in FIG. 5, the rear-side vehicle-width-direction wall portion 150 is configured to protrude on the inner-face side of the housing body 11, and referring to FIG. 1, the portion of the housing inward-vertical wall portion 119 which is positioned on the inward side, in the vehicle width direction, of the suspension tower portion 12 is configured to be exposed to the outer-surface side. Further, similarly to the front-side vehicle-width-direction wall portion 140, the rear-side vehicle-width-direction wall portion 150 extends continuously over an area from the housing outward-end portion 10A to the housing inward-end portion 10B, and extends in the vehicle width direction over the inside of the closed cross section of the apron frame 60.

Further, in the outward-side upper wall portion 113, a pair of front-and-rear central vehicle-width-direction wall portions 160, 160 are provided, between the outward protrusion portion 114 and the vertical wall portion 115, to protrude toward the inner-face side, and the central vehicle-width-direction wall portions 160 extend continuously on the upper-face side of the housing outward flange portion 116. Accordingly, the central vehicle-width-direction wall portions 160 extend from the outward protrusion portion 114 over the inside of the closed cross section of the apron frame 60.

Further, in the housing inward-end portion 10B, a lower end portion of the housing front wall portion 117 is exposed from the housing forward flange portion 117d to the inside-face side of the suspension housing 10. Likewise, a lower end portion of the housing rear wall portion 118 is exposed from the housing rearward flange portion 118d to the inside-face side of the suspension housing 10.

Thus, a U-shaped front-side sectional portion 14 which opens to the inner-face side (the outward side in the vehicle width direction or the downward side) of the suspension housing 10 is formed at a position forward adjacent to the suspension tower portion 12. The front-side sectional portion 14 comprises a front-side vertical-direction sectional portion 141 which extends in the vertical direction and a front-side vehicle-width-direction sectional portion 142 which extends outward, in the vehicle width direction, from an upper end portion of the front-side vertical-direction sectional portion 141.

The front-side vertical-direction sectional portion 141 is formed by the front-side vehicle-width-direction wall portion 140, the housing front wall portion 117, and the front-side inward vertical wall portion 119A so as to have a U-shaped cross section opening outward in the vehicle width direction. The front-side vehicle-width-direction sectional portion 142 is formed by the front-side vehicle-width-direction wall portion 140, the housing front wall portion 117, and the housing upper wall portion 110 so as to have a U-shaped cross section opening downward.

Likewise, a U-shaped rear-side sectional portion 15 which opens to the inner-face side (the outward side in the vehicle width direction or the downward side) of the suspension housing 10 is formed at a position rearward adjacent to the suspension tower portion 12. The rear-side sectional portion 15 comprises a rear-side vertical-direction sectional portion 151 which extends in the vertical direction and a rear-side vehicle-width-direction sectional portion 152 which extends outward, in the vehicle width direction, from an upper end portion of the rear-side vertical-direction sectional portion 151.

The rear-side vertical-direction sectional portion 151 is formed by the rear-side vehicle-width-direction wall portion 150, the housing rear wall portion 118, and the rear-side inward vertical wall portion 119B so as to have a U-shaped cross section opening outward in the vehicle width direction. The rear-side vehicle-width-direction sectional portion 152 is formed by the rear-side vehicle-width-direction wall portion 150, the housing rear wall portion 118, and the housing upper wall portion 110 so as to have a U-shaped cross section opening downward.

That is, the front-side vertical-direction sectional portion 141 and the rear-side vertical-direction sectional portion 151 are configured to have the U-shaped cross section at the housing inward-end portion 10B as well. As shown in FIG. 2, the front-side vertical-direction sectional portion 141 is joined to the outer face 20A of the front frame 20 from the outward side at its lower end portion. Likewise, the rear-side vertical-direction sectional portion 151 is joined to the outer face 20A of the front frame 20 from the outward side at its lower end portion, which is not illustrated. In other words, the lower end portions of the front-side vertical-direction sectional portion 141 and the rear-side vertical-direction sectional portion 151 are configured to overlap the front frame 20 in the vehicle side view.

Accordingly, the housing front wall portion 117 and the housing rear wall portion 118 extend over the joint portions to the front frame 20 at the housing inward-end portion 10B, in addition to the front-side vehicle-width-direction wall portion 140 and the rear-side vehicle-width-direction wall portion 150. Thereby, a decrease of the rigidity which is to be caused by absence of the front-side vehicle-width-direction wall portion 140, the rear-side vehicle-width-direction wall portion 150, the housing front wall portion 117, and the housing rear wall portion 118 does not happen, so that the bending rigidity of the vehicle width direction of the suspension housing 10 can be improved properly.

Moreover, the front-side vertical-direction sectional portion 141 and the rear-side vertical-direction sectional portion 151 are joined to the outer face 20A of the front frame 20 at the housing inward-end portion 10B, keeping the U-shaped cross section having the high rigidity. Thereby, the bending rigidity of the vehicle width direction can be further improved. Accordingly, the suspension housing 10 (the suspension tower portion 12) can be effectively prevented from falling down inward.

Moreover, the front-side vehicle-width-direction sectional portion 142 and the rear-side vehicle-width-direction sectional portion 152 extend up to the vertical wall portion 115 at the housing outward-end portion 10A, and the front-side vehicle-width-direction wall portion 140 and the rear-side vehicle-width-direction wall portion 150 extend inside the closed cross section of the apron frame 60. Thereby, the rigidity of the vertical direction of the suspension housing 10 at the housing outward-end portion 10A can be improved.

As shown in FIG. 5, the pair of front-and-rear central vehicle-width-direction wall portions 160 extend from the outward protrusion portion 114 up to the housing outward flange portion 116, interposing the vertical wall portion 115. Thereby, the rigidity of the vertical direction of the suspension housing 10 can be further improved.

A front-side upper-arm attachment portion 143 and a rear-side upper-arm attachment portion 153 are provided at the upper end portions of the front-side vertical-direction sectional portion 141 and the rear-side vertical-direction sectional portion 151. The front-side upper-arm attachment portion 143 and the rear-side upper-arm attachment portion 153 are made of a hole portion which penetrates in the vehicle longitudinal direction, respectively. Referring to FIG. 3 as well, the arm inward-end portions 721 are rotatably supported at the front-side upper-arm attachment portion 143 and the rear-side upper-arm attachment portion 153 via appropriate fastening members.

As shown in FIG. 1, a pair of rib-shaped front wall vertical-direction wall portions 117c, 117c which extend upward from the housing forward flange portion 117d are formed at the housing front wall portion 117 on both sides, in the vehicle width direction, of the front-side upper-arm attachment portion 143.

Accordingly, the housing front wall portion 117 is configured such that the rigidity of the vertical direction thereof is increased effectively by the front wall curve portion 117b and the pair of front wall vertical-direction wall portions 117c, 117c, so that the housing front wall portion 117 can effectively resist against the vertical-direction load inputted to the front-side upper-arm attachment portion 143 from the arm inward-end portions 721 of the upper arm 72.

As shown in FIG. 6, a pair of rib-shaped rear wall vertical-direction wall portions 118c, 118c which extend upward from the housing rearward flange portion 118d are formed at the housing rear wall portion 118 on both sides, in the vehicle width direction, of the rear-side upper-arm attachment portion 153.

Accordingly, the housing rear wall portion 118 is configured such that the rigidity of the vertical direction thereof is increased effectively by the rear wall curve portion 118b and the pair of rear wall vertical-direction wall portions 118c, 118c, so that the housing rear wall portion 118 can effectively resist against the vertical-direction load inputted to the rear-side upper-arm attachment portion 153 from the arm inward-end portions 721 of the upper arm 72.

As shown in FIG. 5, a pair of front-side longitudinal-direction wall portions 144, 144 which partition the front-side vehicle-width-direction sectional portion 142 in the vehicle width direction are formed at the front-side vehicle-width-direction sectional portion 142 on both sides, in the vehicle width direction, of the suspension tower portion 12.

The housing front wall portion 117 and front-side vehicle-width-direction wall portion 140 are connected in the longitudinal by the pair of front-side longitudinal-direction wall portions 144, 144, so that changing of the distance, in the longitudinal direction, between the housing front wall portion 117 and front-side vehicle-width-direction wall portion 140 is suppressed even in a load input. Accordingly, deformation of the U-shaped cross section of the front-side vehicle-width-direction sectional portion 142 is suppressed, so that the rigidity of the vertical direction and the vehicle width direction of the front-side vehicle-width-direction sectional portion 142 is properly improved.

Likewise, a pair of rear-side longitudinal-direction wall portions 154, 154 which partition the rear-side vehicle-width-direction sectional portion 152 in the vehicle width direction are formed at the rear-side vehicle-width-direction sectional portion 152 on both sides, in the vehicle width direction, of the suspension tower portion 12.

Since the housing rear wall portion 118 and rear-side vehicle-width-direction wall portion 150 are connected in the longitudinal direction by the pair of rear-side longitudinal-direction wall portions 154, 154, changing of the distance, in the longitudinal direction, between the housing rear wall portion 118 and rear-side vehicle-width-direction wall portion 150 is suppressed even in the load input. Accordingly, deformation of the U-shaped cross section of the rear-side vehicle-width-direction sectional portion 152 is suppressed, so that the rigidity of the vertical direction and the vehicle width direction of the rear-side vehicle-width-direction sectional portion 152 is improved.

The pair of front-side longitudinal-direction wall portions 144, 144 are connected to the pair of front wall inclination portions 117a, 117a roughly perpendicularly. Likewise, the pair of rear-side longitudinal-direction wall portions 154, 154 are connected to the pair of rear wall inclination portions 118a, 118a roughly perpendicularly. Herein, the pair of front wall inclination portions 117a, 117a and the pair of rear wall inclination portions 118a, 118a are respectively formed at the housing front wall portion 117 and the housing rear wall portion 118 having the U-shaped front-side sectional portion 14 and the U-shaped rear-side sectional portion 15, respectively, which are positioned on the opposite side, in the longitudinal direction, to the suspension tower portion 12. Accordingly, the pair of front-side longitudinal-direction wall portions 144, 144 and the pair of rear-side longitudinal-direction wall portions 154, 154 are provided around the suspension tower portion 12 in such a manner they enclose the suspension tower portion 12.

That is, a truss structure where the suspension tower portion 12 and the pair of front-side longitudinal-direction wall portions 144, 144 are arranged in a roughly-triangular shape is formed in front of the suspension tower portion 12, and another truss structure where the suspension tower portion 12 and the pair of rear-side longitudinal-direction wall portions 154, 154 are arranged in the roughly-triangular shape is formed in back of the suspension tower portion 12. Thereby, the rigidity of the vehicle width direction and the longitudinal direction of a surrounding of the suspension tower portion 12 can be improved further effectively.

[Suspension Tower 12]

As shown in FIG. 6, the suspension tower portion 12 comprises a tower upper wall portion 120 which has a top wall portion where the damper member 71 (see FIG. 2) is attached and a tower top wall portion 127 which is provided to be offset upward from a central portion of the tower upper wall portion 120 via a suspension-top vertical wall portion 122, which is formed in a two-stage structure. The suspension tower portion 12 further comprises a tower outer-peripheral wall portion 126 which extends downward via a tower curve portion 128 which curves downward from an outer-peripheral portion of the tower upper wall portion 120.

Plural suspension fastening portions where the upper end portion of the damper member 71 is fixedly fastened are formed at the tower upper wall portion 120. The suspension fastening portions 121 are positioned at three-point positions on a circumference around the center line O1 (see FIG. 2) of the damper member 71 substantially at regular intervals.

Figure 7:
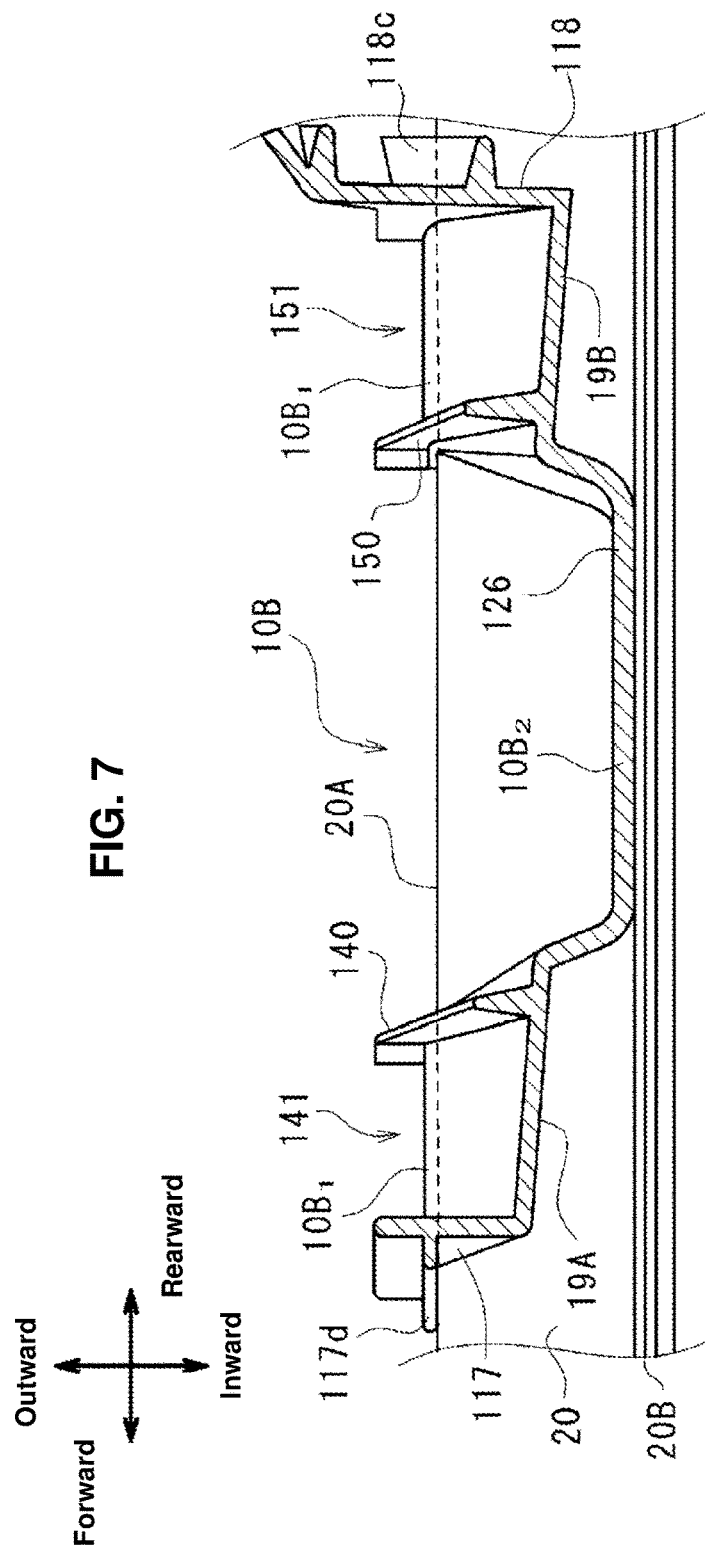
FIG. 7 is a sectional view taken along line VII-VII of FIG. 1.

As shown in FIG. 2, the tower outer-peripheral wall portion 126 extends roughly downward, in the vertical direction, from an inward-side end portion, in the vehicle width direction, of the tower upper wall portion 120 and is joined to the flange portion 20B of the front frame 20 from the outward side, in the vehicle width direction, of the vehicle. FIG. 7 is a roughly-horizontal-direction sectional view taken along line VII-VII of FIG. 1, which shows the vicinity of the housing inward-end portion 10B. As shown in FIG. 7, the tower outer-peripheral wall portion 126 is configured to have a U-shaped cross section opening outward in the vehicle width direction.

As described above, the front-side vertical-direction sectional portion 141 and the rear-side vertical-direction sectional portion 151 are joined to the outer face 20A of the front frame 20 adjacently to the front and rear sides of the suspension tower portion 12. The housing inward-end portion 10B is configured such that outward-side joint portions $10B_1$, $10B_1$ (the lower end portions of the front-side and rear-side vertical-direction sectional portions 141, 151) which are joined to the outer face 20A of the front frame 20 and an inward-side joint portion $10B_2$ (the lower end of the tower outer-peripheral wall portion 126) which is joined to the flange portion 20B of the front frame 20 are aligned in the vehicle longitudinal direction.

Further, the outward-side joint portions $10B_1$ and the inward-side joint portion $10B_2$ are respectively positioned on the outward side, in the vehicle width direction, of the flange portion 20B of the front frame 20, and configured to be assembled and joined to the front frame 20 from the outward side in the vehicle width direction.

By joining the suspension housing 10 to the front frame 20 at the outward-side joint portions $10B_1$ and the inward-side joint portion $10B_2$ which are aligned in the vehicle longitudinal direction, the bending rigidity of the vehicle width direction of the suspension housing 10 can be improved.

Moreover, the outward-side joint portions $10B_1$ and the inward-side joint portion $10B_2$ are respectively positioned on the outward side of the flange portion 20B. This arrangement requires that the suspension housing 10 is moved from the outward side to the inward side in the vehicle width direction when the suspension housing 10 is assembled to the front frame 20, not requiring that the suspension housing 10 is moved in the vertical direction in order to get over the flange portion 20B of the front frame 20.

Accordingly, the bending rigidity of the vehicle width direction of the suspension housing 10 can be improved and also the suspension housing 10 can be easily assembled to the front frame 20.

Further, the flange portion 20B is positioned on the inward side, in the vehicle width direction, of the central portion of the front frame 20. Thereby, a distance, in the vehicle width direction, between the outward-side joint portion $10B_1$ and the inward-side joint portion $10B_2$ can be enlarged, so that the bending rigidity of the vehicle width direction of the suspension housing 10 can be improved further. Also, it becomes easy to enlarge the tower outer-peripheral wall portion 126 inward in the vehicle width direction and the secondary cross-sectional moment of the tower outer-peripheral wall portion 126 increases, so that the bending rigidity of the vehicle width direction of the suspension tower portion 12 can be further improved.

Further, as shown in FIG. 2, the tower outer-peripheral wall portion 126 extends substantially downward in the vertical direction and is joined to the flange portion 20B of the front frame 20. This arrangement enables the tower outer-peripheral wall portion 126 to be connected to the flange portion 20B with a short distance, so that the tower outer-peripheral wall portion 126 can be made compact and the facial rigidity of the tower outer-peripheral wall portion 126 can be improved.

Figure 8:
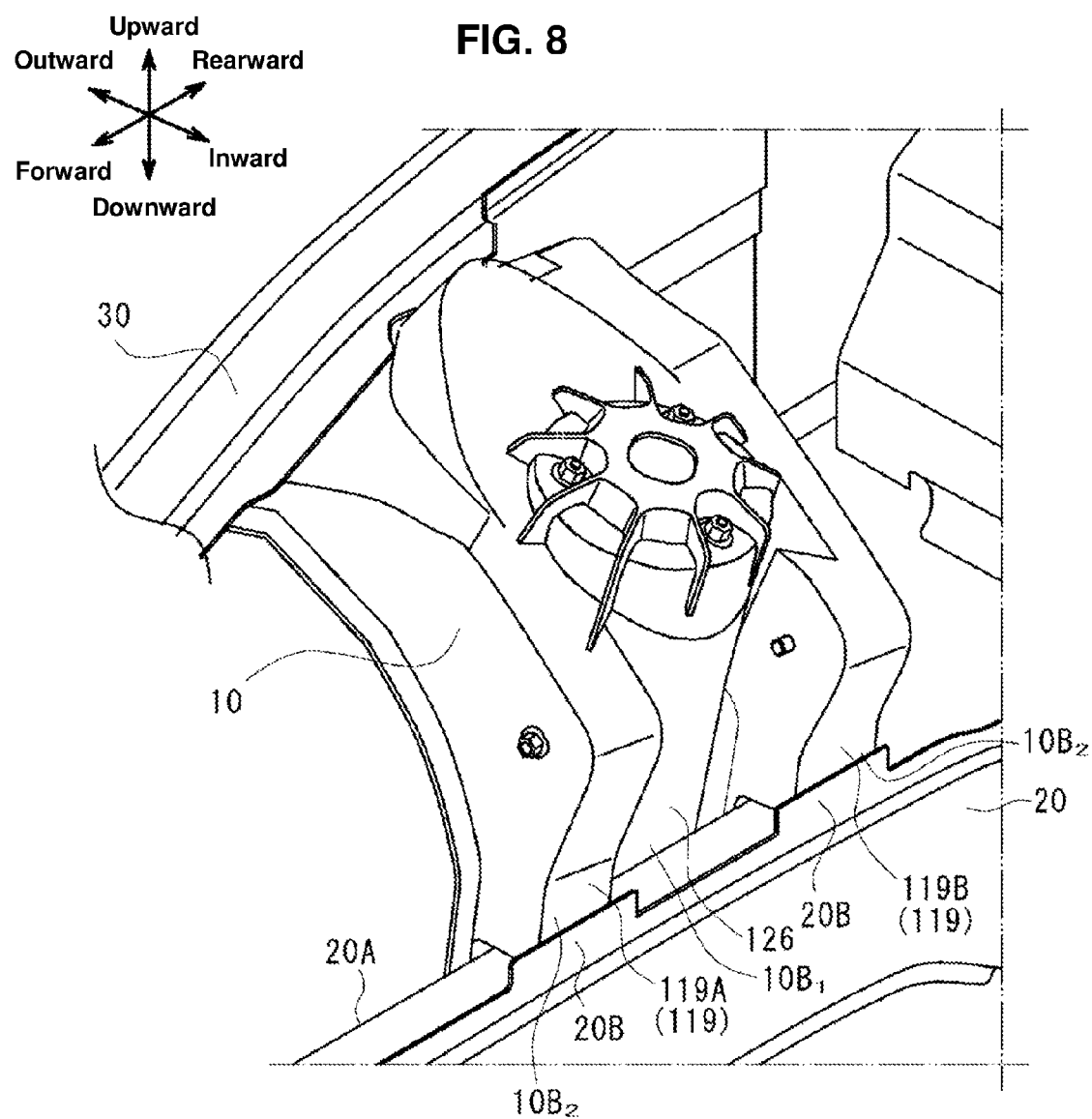
FIG. 8 is a sectional view showing a front vehicle-body structure of the vehicle according to a modified embodiment.

Herein, alternatively, the inward-side joint portion $10B_2$ may be formed at the housing inward-side vertical wall portion 119, and the outward-side joint portion $10B_1$ may be formed at the tower outer-peripheral wall portion 126. That is, as shown in FIG. 8, the housing inward-side vertical wall portion 119 may be configured to extend roughly downward in the vertical direction and be joined to the flange portion 20B of the front frame 20, and the tower outer-peripheral portion 126 may be configured to extend obliquely downward and outward in the vehicle width direction and be joined to the outer face 20A of the front frame 20.

In this case as well, the outward-side joint portions $10B_1$ and the inward-side joint portion $10B_2$ can be arranged to be aligned in the vehicle longitudinal direction at the housing inward-end portion 10B, so that the bending rigidity of the vehicle width direction of the suspension housing 10 can be improved. Moreover, since the outward-side joint portions $10B_1$ and the inward-side joint portion $10B_2$ are positioned on the outward side, in the vehicle width direction, of the flange portion 20B of the front frame 20, the suspension housing 10 can be moved from the outward side, in the vehicle width direction, and assembled to the front frame 20, without being moved in the vertical direction.

[Connecting Member 50]

Figure 9:
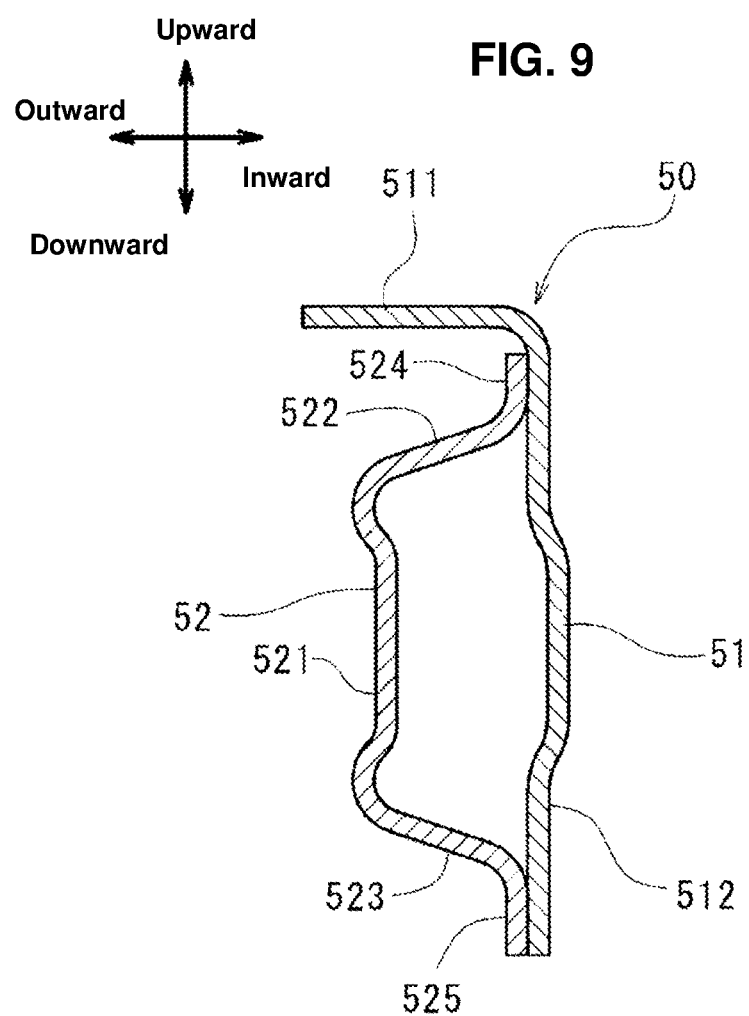
FIG. 9 is a sectional view taken along line IX-IX of FIG. 1.

Referring to FIG. 1, the connecting member 50 extends in the longitudinal direction so as to connect the suspension housing 10 and the dash panel 40, and more specifically, extends obliquely rearward and inward. FIG. 9 is a sectional view taken along line IX-IX of FIG. 1, which shows a cross section perpendicular to an extension direction of the connecting member 50 at a roughly-central portion, in a longitudinal direction, of the connecting member 50. As show in FIG. 9, the connecting member 50 comprises a connecting member inner 51 which is positioned on the inward in the vehicle width direction and a connecting member outer 52 which is positioned on the outward side in the vehicle width direction.

The connecting member inner 51 is made by bending a steel plate so as to have an L-shaped cross section, and comprises an inner upper wall portion 511 which extends in a substantially horizontal direction and an inner vertical wall portion 512 which extends downward from an inward side, in the vehicle width direction, of the inner upper wall portion 511. The inner upper wall portion 511 extends in parallel to the first face portion 131 (see FIG. 4) of the connecting-member attachment portion 13. The inner vertical wall portion 512 extends in parallel to the second face portion 132 (see FIG. 4) of the connecting-member attachment portion 13.

The connecting member outer 52 is made by bending a steel plate so as to have a U-shaped cross section which opens inward in the vehicle width direction, and comprises an outer vertical wall portion 521 which extends in the vertical direction, an outer upper wall portion 522 and an outer lower wall portion 523 which extend inward in the vehicle width direction from an upper end portion and a lower end portion of the outer vertical wall portion 521, respectively, an outer upper flange 524 which extends upward from a left end portion of the outer upper wall portion 522, and an outer lower flange 525 which extends downward from a left end portion of the outer lower wall portion 523.

The connecting member outer 52 is joined to the inner vertical wall portion 512 from the outward side in the vehicle width direction at the outer upper flange 524 and the outer lower flange 525 by spot welding, for example, so that a roughly-rectangular closed cross section is formed by the connecting member inner 51 and the connecting member outer 52.

Figure 10:
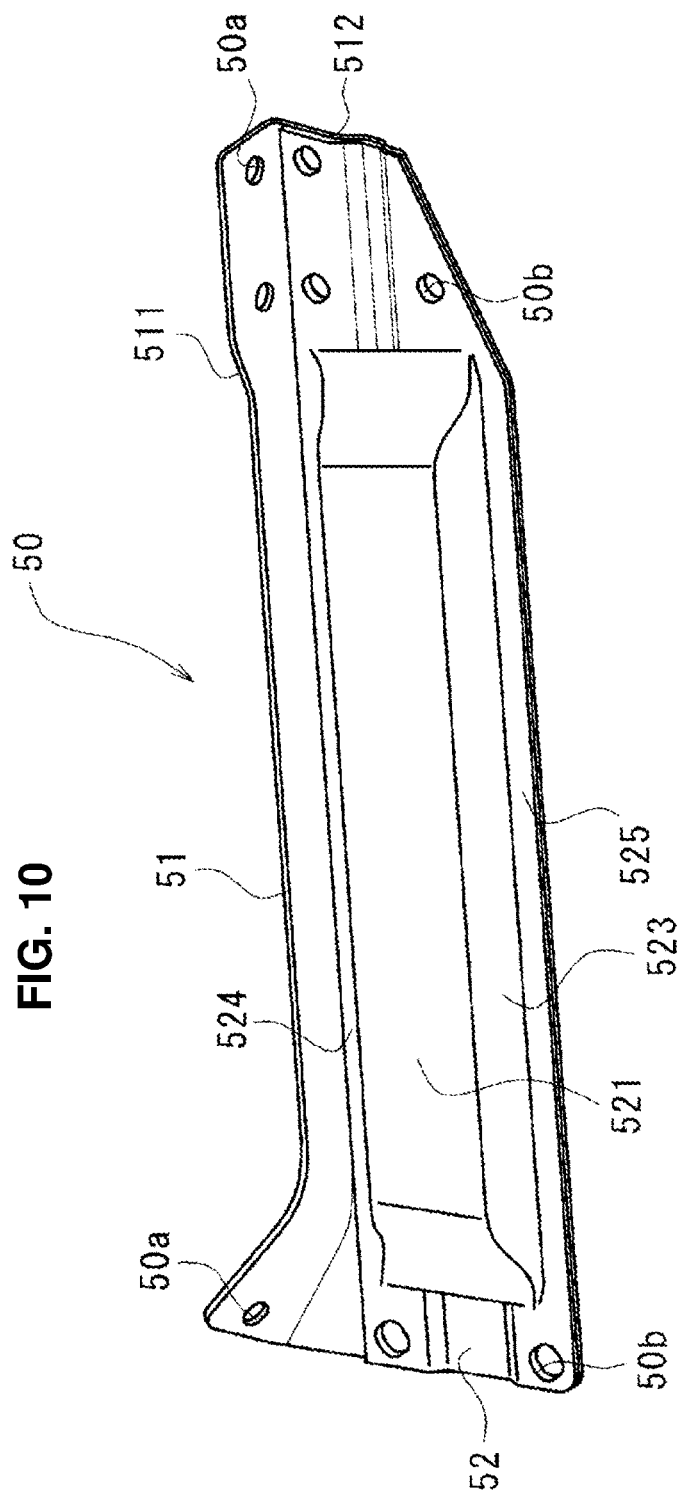
FIG. 10 is a perspective view of a connecting member, when viewed from an outward side in a vehicle width direction.

FIG. 10 is a perspective view of the connecting member 50 alone, when viewed from the outward side in the vehicle width direction (the side of the connecting member outer 52). Referring to FIG. 10, the connecting member inner 51 is configured to have a roughly L-shaped cross section which extends over its longitudinal direction. The inner upper wall portion 511 is configured such that its connection portion to the dash panel 40 is slightly bent upward, so that it can be provided along a vertically-extending face of the dash panel 40.

Meanwhile, the connecting member outer 52 is configured such that only a midway portion in its longitudinal direction (in the vehicle longitudinal direction) thereof, excluding its both end portions, has a U-shaped cross section and the outer vertical wall portion 521 extends along the inner vertical wall portion 512 at its both end portions.

The both end portions, in the longitudinal direction, of the connecting member 50 is configured to have a roughly-L shaped cross section formed by the inner upper wall portion 511 extending in the substantially horizontal direction and an overlap portion which is formed by the inner vertical wall portion 512 and the outer vertical wall portion 521 which are overlapped each other and extends downward.

The connecting member 50 has, at its longitudinal-direction both end portions, plural connecting-member attaching holes 50a which penetrate the inner vertical wall portion 511 in a plate-thickness direction (the vertical direction) and plural connecting-member attaching holes 50b which penetrate the inner vertical wall portion 512 and the outer vertical wall portion 521 in a plate-thickness direction (the vehicle width direction), and is detachably attached to the connecting-member attachment portion 13 of the suspension housing 10 and the protrusion portion 41 of the dash panel 40 through the connecting-member attaching holes 50a, 50b by manes of appropriate fastening members. In the figures, illustration of attached portions, such as female screws, at the connecting-member attachment portion 13 of the suspension housing 10 and the protrusion portion 41 of the dash panel 4 is omitted.

Accordingly, the connecting member 50 is configured such that both end portions, in its longitudinal direction, thereof have an L-shaped cross section formed by the connecting member inner 51 and also a vertically-extending vertical wall portion is formed in a double structure by the inner vertical wall portion 512 and the outer vertical wall portion 521. Meanwhile, the connecting member 50 is configured such that a midway portion, in its longitudinal direction, thereof, excluding its both end portions, has an L-shaped cross section by means of the connecting member inner 51 and also have a closed cross section formed by the inner vertical wall portion 512 and the connecting member outer 52.

The first face portion 131 of the connecting-member attachment portion 13 extends in parallel to the inner upper wall portion 511 of the connecting member 50, and the second face portion 132 extends in parallel to the inner vertical wall portion 512 of the connecting member 50. Thereby, the connecting member 50 is connected to the suspension housing 10 at its connection portion, not via any member, such as a flange, or without changing its shape so as to match the suspension housing 10.

Accordingly, since the connecting member 50 is configured such that its sectional shape can be continuous over its longitudinal direction, including its connection portion to the suspension housing 10 (the connecting-member attachment portion 13), decreasing of the rigidity which may be caused by discontinuity of the shape at the connection portion can be properly avoided. Thereby, the support rigidity of the suspension housing 10 which is to be achieved by means of the connecting member 50 can be improved.

Since the connecting member 50 is connected by the connecting member inner 51 over a range between the suspension housing 10 and the dash panel 40 with the roughly L-shaped cross section, the rigidity can be made high, so that the suspension housing 10 can be properly supported.

Further, since the connecting member 50 is configured by the connecting member outer 52 such that the midway portion, in its longitudinal direction, thereof, excluding its both end portions has the closed cross section, the rigidity of the connecting member 50 is so further increased that the suspension housing 10 can be prevented from deforming in the vehicle longitudinal direction and in the vehicle width direction. Further, since the connecting member 50 is configured such that the both end portions, in its longitudinal direction, thereof have the L-shaped cross section and the vertically-extending vertical wall portion is formed in the double structure, the rigidity of the vertical direction of its connection portion to the connected member can be further increased.

Accordingly, since the connecting member 50 can support the suspension housing 10 firmly in the vehicle longitudinal direction and in the vehicle width direction, the suspension housing 10 can be more properly prevented from falling down inward in the vehicle width direction or deforming in the vehicle longitudinal direction.

Moreover, the connecting-member attachment portion 13 is configured such that the rear face portion 133 is continuous to the housing rear wall portion 118, so that the rigidity of the vertical direction of the housing rear wall portion 118 is improved by the vertical-direction wall portion 118c. Accordingly, the out-of-plane deformation of the connecting-member attachment portion 13 can be suppressed. Thereby, the rigidity of the vertical direction of the connecting-member attachment portion 13 can be improved, so that the vertical-direction input load which is inputted from the suspension 70 to the suspension housing 10 can be efficiently transmitted to the connecting member 50 by way of the connecting-member attachment portion 13.

While the above-described embodiments described that the suspension housing 10 is made by the aluminum die-casting method, it may be made of a casting or forging which is made from steel or another light metal than aluminum. Alternatively, it may be made by pressing a steel plate or by joining plural members by means of welding or the like. Additionally, the suspension-tower portion structure may be made from CFRP (Carbon-Fiber Reinforced Plastic).

The present invention should not be limited to the above-described embodiments and any other modifications or improvements may be applied within the scope of a spirit of the present invention.

What is claimed is:

1. A front vehicle-body structure of a vehicle, comprising:
a front frame extending in a longitudinal direction;
an apron reinforcement positioned above and on an outward side, in a vehicle width direction, of the front frame and extending in the longitudinal direction; and
a suspension housing provided to be laid between the front frame and the apron reinforcement and accommodating a suspension therein,
wherein said suspension housing comprises a housing upper wall portion which extends in the vehicle width direction and in the longitudinal direction, a housing front wall portion and a housing rear wall portion which extend downward respectively from a front end portion and a rear end portion of said housing upper wall portion, and a housing inward-vertical wall portion which extends downward from an inward end portion, in the vehicle width direction, of said housing upper wall portion and is connected respectively to said housing front wall portion and said housing rear wall portion,
said housing upper wall portion includes a narrow-width portion, an inward upper wall portion which is positioned on an inward side, in the vehicle width direction, of said narrow-width portion, and an outward upper wall portion which is positioned on an outward side, in the vehicle width direction, of said narrow-width portion, a width, in the longitudinal direction, of each of the narrow-width portion, the inward upper wall portion, and outward upper wall portion being configured such that the width of the narrow-width portion is the narrowest of the three portions, the width of the inward upper wall portion decreases gradually toward the narrow-width portion, and the width of the outward upper wall portion decreases gradually toward the narrow-width portion, and
a suspension tower portion where a damper member of the suspension is attached is positioned at a portion of said housing upper wall portion of said suspension housing which includes at least said narrow-width portion such that said suspension tower portion protrudes upward.

2. The front vehicle-body structure of the vehicle of claim 1, wherein said suspension housing further includes an upper-arm attachment portion where an upper arm of the suspension is vertically rotatably attached, and the suspension housing is configured such that a width, in the longitudinal direction, thereof gradually decreases from said upper-arm attachment portion toward said narrow-width portion so as to match a shape of the upper arm.

3. The front vehicle-body structure of the vehicle of claim 2, wherein a protrusion portion which protrudes upward is formed at said suspension housing on an opposite side, in the vehicle width direction, to said upper-arm attachment portion relatively to said suspension tower portion, the protrusion portion being configured to avoid interference thereof with a tip portion of the upper arm which has rotated upward.

4. The front vehicle-body structure of the vehicle of claim 1, wherein an apron frame which extends in the longitudinal direction is provided at an outward-end portion, in the vehicle width direction, of said suspension housing between said apron reinforcement and the suspension housing, the suspension housing further includes a vehicle-width-direction wall portion which protrudes toward the suspension and extends in a vertical direction and in the vehicle width direction in a vehicle front view, said vehicle-width-direction wall portion is composed of a pair of front-and-rear portions which are positioned on at least one side or both sides of a forward side and a reward side of said suspension tower portion, and said pair of front-and-rear vehicle-width-direction wall portions are interconnected in the longitudinal direction by a longitudinal-direction wall portion around the suspension tower portion.

5. The front vehicle-body structure of the vehicle of claim 2, wherein an apron frame which extends in the longitudinal direction is provided at an outward-end portion, in the vehicle width direction, of said suspension housing between said apron reinforcement and the suspension housing, the suspension housing further includes a vehicle-width-direction wall portion which protrudes toward the suspension and extends in a vertical direction and in the vehicle width direction in a vehicle front view, said vehicle-width-direction wall portion is composed of a pair of front-and-rear portions which are positioned on at least one side or both sides of a forward side and a reward side of said suspension tower portion, and said pair of front-and-rear vehicle-width-direction wall portions are interconnected in the longitudinal direction by a longitudinal-direction wall portion around the suspension tower portion.

6. The front vehicle-body structure of the vehicle of claim 3, wherein an apron frame which extends in the longitudinal direction is provided at an outward-end portion, in the vehicle width direction, of said suspension housing between said apron reinforcement and the suspension housing, the suspension housing further includes a vehicle-width-direction wall portion which protrudes toward the suspension and extends in a vertical direction and in the vehicle width direction in a vehicle front view, said vehicle-width-direction wall portion is composed of a pair of front-and-rear portions which are positioned on at least one side or both sides of a forward side and a reward side of said suspension tower portion, and said pair of front-and-rear vehicle-width-direction wall portions are interconnected in the longitudinal direction by a longitudinal-direction wall portion around the suspension tower portion.

7. The front vehicle-body structure of the vehicle of claim 4, wherein one of said pair of front-and-rear vehicle-width-direction wall portions which is located at a position opposite to said suspension tower portion in the longitudinal direction includes a pair of right-and-left inclination portions on both sides, in the vehicle width direction, of the suspension tower portion, the pair of right-and-left inclination portions being configured to be inclined, in the longitudinal direction, toward the suspension tower portion relatively to the vehicle width direction, and said longitudinal-direction wall portion is composed of a pair of portions which are formed at both sides, in the vehicle width direction, of the suspension tower portion so as to be provided substantially perpendicularly to said pair of right-and-left inclination portions.

8. The front vehicle-body structure of the vehicle of claim 5, wherein one of said pair of front-and-rear vehicle-width-direction wall portions which is located at a position opposite to said suspension tower portion in the longitudinal direction includes a pair of right-and-left inclination portions on both sides, in the vehicle width direction, of the suspension tower portion, the pair of right-and-left inclination portions being configured to be inclined, in the longitudinal direction, toward the suspension tower portion relatively to the vehicle width direction, and said longitudinal-direction wall portion is composed of a pair of portions which are formed at both sides, in the vehicle width direction, of the suspension tower portion so as to be provided substantially perpendicularly to said pair of right-and-left inclination portions.

9. The front vehicle-body structure of the vehicle of claim 6, wherein one of said pair of front-and-rear vehicle-width-direction wall portions which is located at a position opposite to said suspension tower portion in the longitudinal direction includes a pair of right-and-left inclination portions on both sides, in the vehicle width direction, of the suspension tower portion, the pair of right-and-left inclination portions being configured to be inclined, in the longitudinal direction, toward the suspension tower portion relatively to the vehicle width direction, and said longitudinal-direction wall portion is composed of a pair of portions which are formed at both sides, in the vehicle width direction, of the suspension tower portion so as to be provided substantially perpendicularly to said pair of right-and-left inclination portions.

* * * * *